(12) United States Patent
Ikarashi

(10) Patent No.: US 11,625,363 B2
(45) Date of Patent: Apr. 11, 2023

(54) SECRET DEDUPLICATION FILTER GENERATION SYSTEM, SECRET DEDUPLICATION SYSTEM, METHOD FOR THESE, SECRET CALCULATION APPARATUS, AND PROGRAM

(71) Applicant: NIPPON TELEGRAPH AND TELEPHONE CORPORATION, Chiyoda-ku (JP)

(72) Inventor: Dai Ikarashi, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 183 days.

(21) Appl. No.: 16/981,472

(22) PCT Filed: Mar. 14, 2019

(86) PCT No.: PCT/JP2019/010457
§ 371 (c)(1),
(2) Date: Sep. 16, 2020

(87) PCT Pub. No.: WO2019/188320
PCT Pub. Date: Oct. 3, 2019

(65) Prior Publication Data
US 2021/0026812 A1 Jan. 28, 2021

(30) Foreign Application Priority Data
Mar. 26, 2018 (JP) .............................. JP2018-058270

(51) Int. Cl.
*G06F 16/17* (2019.01)
*G06F 16/174* (2019.01)

(52) U.S. Cl.
CPC .............................. *G06F 16/1748* (2019.01)

(58) Field of Classification Search
CPC ............. G06F 16/1748; G06F 16/2365; G06F 16/174; G06F 16/1744
See application file for complete search history.

(56) References Cited

U.S. PATENT DOCUMENTS

| 2013/0182836 A1* | 7/2013 | Hamada | ................ | H04L 9/0891 380/28 |
| 2013/0272521 A1* | 10/2013 | Kipnis | .................. | H04L 9/0816 380/44 |

(Continued)

*Primary Examiner* — Cindy Nguyen
(74) *Attorney, Agent, or Firm* — Oblon, McClelland, Maier & Neustadt, L.L.P.

(57) ABSTRACT

A secure deduplication system, including a plurality of secure computation apparatuses, wherein the plurality of secure computation apparatuses include a plurality of permutation calculation parts $11_n$ for generating a share $\{\{\sigma\}\}$ of a permutation $\sigma$ that stably sorts a vector v in ascending order, a plurality of permutation application parts $12_n$ for generating a share $[\sigma(v)]$ of a vector $\sigma(v)$ obtained by applying the permutation $\sigma$ to the vector v, a plurality of vector generation parts $13_n$ for generating a share [e] of a vector e that has 1 as an element corresponding to a certain element when the certain element of the vector $\sigma(v)$ and an element before the certain element are different, and has 0 otherwise, and a plurality of inverse permutation application parts $14_n$ for generating a share $[\sigma^{-1}(e)]$ of a vector $\sigma^{-1}(e)$ obtained by applying an inverse permutation $\sigma^{-1}$ of the permutation $\sigma$ to the vector e.

4 Claims, 3 Drawing Sheets

SECURE DEDUPLICATION SYSTEM
SECURE DEDUPLICATION FILTER GENERATION SYSTEM

(56) References Cited

U.S. PATENT DOCUMENTS

2015/0149763 A1\* 5/2015 Kamara ................. H04W 4/02
                                                  713/150
2016/0321958 A1\* 11/2016 Ikarashi ................ G06F 21/60
2019/0166105 A1\* 5/2019 Romain ............. H04L 63/0435

\* cited by examiner

SECRET DEDUPLICATION FILTER GENERATION SYSTEM, SECRET DEDUPLICATION SYSTEM, METHOD FOR THESE, SECRET CALCULATION APPARATUS, AND PROGRAM

TECHNICAL FIELD

The present invention relates to a secure computation technique. In particular, the present invention relates to a technique for generating a filter that eliminates duplication while maintaining secrecy and a technique for eliminating duplication using the generated filter.

BACKGROUND ART

In the field of secure computation techniques, there is a need for a technique that eliminates duplication of attribute values of a certain attribute in a table while maintaining secrecy.

However, in the field of secure computation techniques, a technique is not known which eliminates duplication of attribute values of a certain attribute in a table while maintaining secrecy.

SUMMARY OF THE INVENTION

Problems to be Solved by the Invention

An object of the present invention is to provide a secure deduplication filter generation system that generates a filter for eliminating duplication while maintaining secrecy, a secure deduplication system that uses the generated filter to eliminate duplication while maintaining secrecy, methods for these, a secure computation apparatus, and a program.

Means to Solve the Problems

A secure deduplication filter generation system according to one aspect of the present invention is a secure deduplication filter generation system comprising a plurality of secure computation apparatuses, wherein assuming that F denotes an arbitrary field, m denotes an integer of two or more, $[\alpha]$ denotes a share where $\alpha$ is securely shared supposing $\alpha$ to be an arbitrary vector, $\{\{\beta\}\}$ denotes a share where $\beta$ is securely shared supposing $\beta$ to be an arbitrary permutation, and v denotes an m-dimensional vector $v \in F^m$, the plurality of secure computation apparatuses include a plurality of permutation calculation parts for generating a share $\{\{\sigma\}\}$ of a permutation $\sigma$ that stably sorts the vector v in ascending order using a share $[v]$ of the vector v, a plurality of permutation application parts for generating a share $[\sigma(v)]$ of a vector $\sigma(v)$ obtained by applying the permutation $\sigma$ to the vector v using the share $[v]$ and the share $\{\{\sigma\}\}$, a plurality of vector generation parts for generating a share $[e]$ of a vector e having 1 as an element corresponding to a certain element when the certain element of the vector $\sigma(v)$ and an element before the certain element are different, and having 0 otherwise using the share $[\sigma(v)]$, and a plurality of inverse permutation application parts for generating a share $[\sigma^{-1}(e)]$ of a vector $\sigma^{-1}(e)$ obtained by applying an inverse permutation $\sigma^{-1}$ of the permutation $\sigma$ to the vector e using the share $[e]$ and the share $\{\{\sigma\}\}$.

A secure deduplication system according to one aspect of the present invention comprises the secure deduplication filter generation system, wherein the secure computation apparatuses further include deduplication parts for generating a share $[v\sigma^{-1}(e)]$ of $v\sigma^{-1}(e)$ using the share $[v]$ and the share $[\sigma^{-1}(e)]$.

A secure computation apparatus according to one aspect of the present invention is the secure computation apparatus of the secure deduplication filter generation system or the secure deduplication system.

Effects of the Invention

According to the invention, it is possible to generate a filter for eliminating duplication while maintaining secrecy. Also, it is possible to eliminate duplication while maintaining secrecy using the generated filter.

DETAILED DESCRIPTION OF THE EMBODIMENTS

Figure 1:
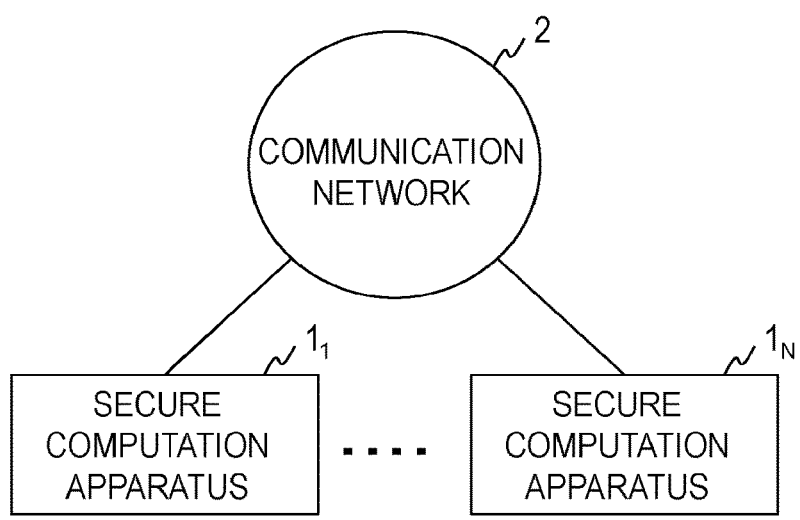
FIG. 1 is a diagram exemplifying a functional configuration of a secure deduplication filter generation system and a secure deduplication system.

Hereinafter, an embodiment of the present invention will be described in detail. Note that component parts having the same functions in the drawings will be denoted by the same reference numerals, and redundant description will be omitted.

A configuration example of a secure deduplication system and a secure deduplication filter generation system of the embodiment will be described with reference to FIG. 1. The secure deduplication system and secure deduplication filter generation system include N ($\geq 2$) secure computation apparatuses $1_1, \ldots, 1_N$. In the embodiment, the secure computation apparatuses $1_1, \ldots, 1_N$ are each connected to a communication network 2. The communication network 2 is a circuit switching or packet switching communication network configured so that each apparatus connected can communicate with each other, and the communication network 2 is, for example, the Internet, a LAN (Local Area Network), or a WAN (Wide Area Network). Note that each apparatus does not necessarily need to be able to communicate online via the communication network 2. For example, information to be input into the secure computation apparatuses $1_1, \ldots, 1_N$ may be stored in a portable recording medium such as a magnetic tape or a USB memory and then input offline from the portable recording medium into the secure computation apparatuses $1_1, \ldots, 1_N$.

Figure 2:
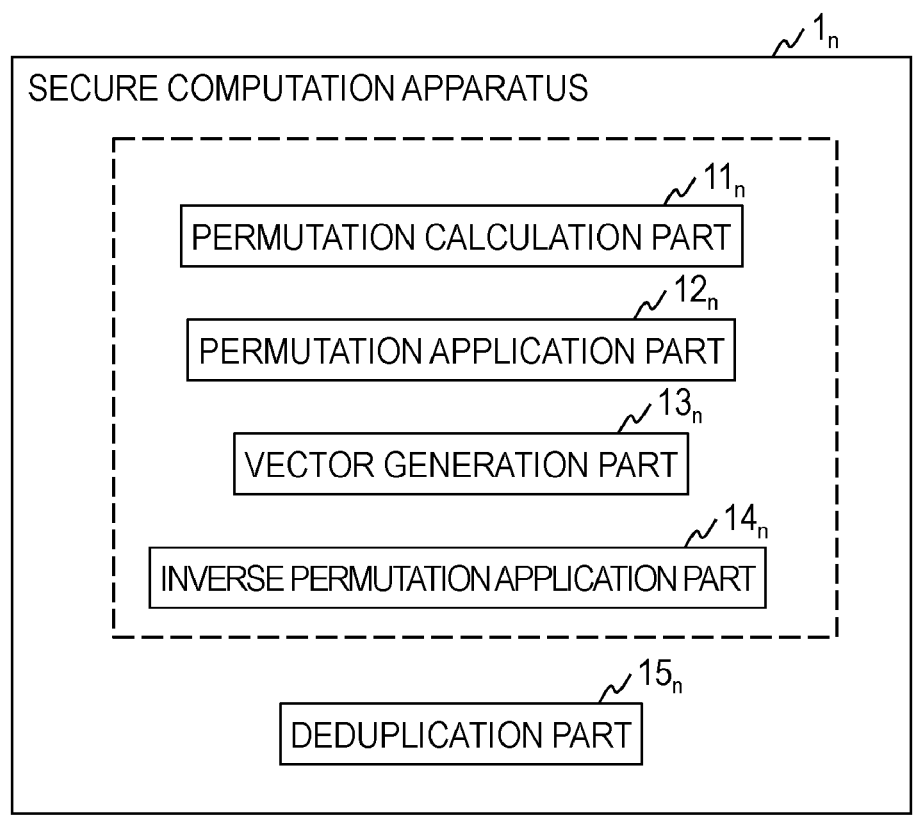
FIG. 2 is a diagram exemplifying a functional configuration of a secure computation apparatus.

A configuration example of the secure computation apparatus $1_n$ (n=1, ..., N) included in the secure deduplication system and secure deduplication filter generation system will be described with reference to FIG. 2. The secure computation apparatus $1_n$ in the secure deduplication filter generation system includes, for example, a permutation calculation part $11_n$, a permutation application part $12_n$, a vector generation part $13_n$, and an inverse permutation application part $14_n$ as shown in FIG. 2. The secure computation apparatus $1_n$ in the secure deduplication system further includes a deduplication part $15_n$.

The permutation calculation part $11_n$, permutation application part $12_n$, vector generation part $13_n$, and inverse permutation application part $14_n$ surrounded by a dashed line inside the secure computation apparatus $1_n$ in FIG. 2 can be said to be a part corresponding to the secure deduplication filter generation system. In addition, the permutation calculation part $11_n$, permutation application part $12_n$, vector generation part $13_n$, inverse permutation application part $14_n$, and deduplication part $15_n$ in the secure computation apparatus $1_n$ can be said to be a part corresponding to the secure deduplication system.

A secure deduplication method and a secure deduplication filter generation method of the embodiment are implemented by performing processing of each step described later while each component part of the secure computation apparatus $1_n$ (1≤n≤N) is cooperating with each component part of the other secure computation apparatuses $1_{n'}$ (n'=1, ..., N, where n≠n'). Step S1 to step S4 is an example of processing of the secure deduplication filter generation method. Step S1 to step S5 is an example of processing of the secure deduplication method.

Note that processing of each step is performed by secure computation. That is, the secure computation apparatus $1_n$ performs the processing of each step without restoring a share, in other words, without knowing contents of the share.

The secure computation apparatus $1_n$ is a special apparatus in which a special program is read into a known or dedicated computer including, for example, a central processing unit (CPU) and a random access memory (RAM). The secure computation apparatus $1_n$ performs each processing, for example, under control of the central processing unit. Data input into the secure computation apparatus $1_n$ or data obtained in each processing is stored in, for example, the random access memory, and the data stored in the random access memory is read out to the central processing unit and used for other processing as needed. At least a part of each processing part of the secure computation apparatus $1_n$ may be made of hardware such as an integrated circuit.

In the following description, it is assumed that $[\alpha]$ is a share where $\alpha$ is securely shared supposing $\alpha$ to be an arbitrary vector, whereas it is assumed that $\{\{\beta\}\}$ is a share where $\beta$ is securely shared supposing $\beta$ to be an arbitrary permutation.

Figure 3:
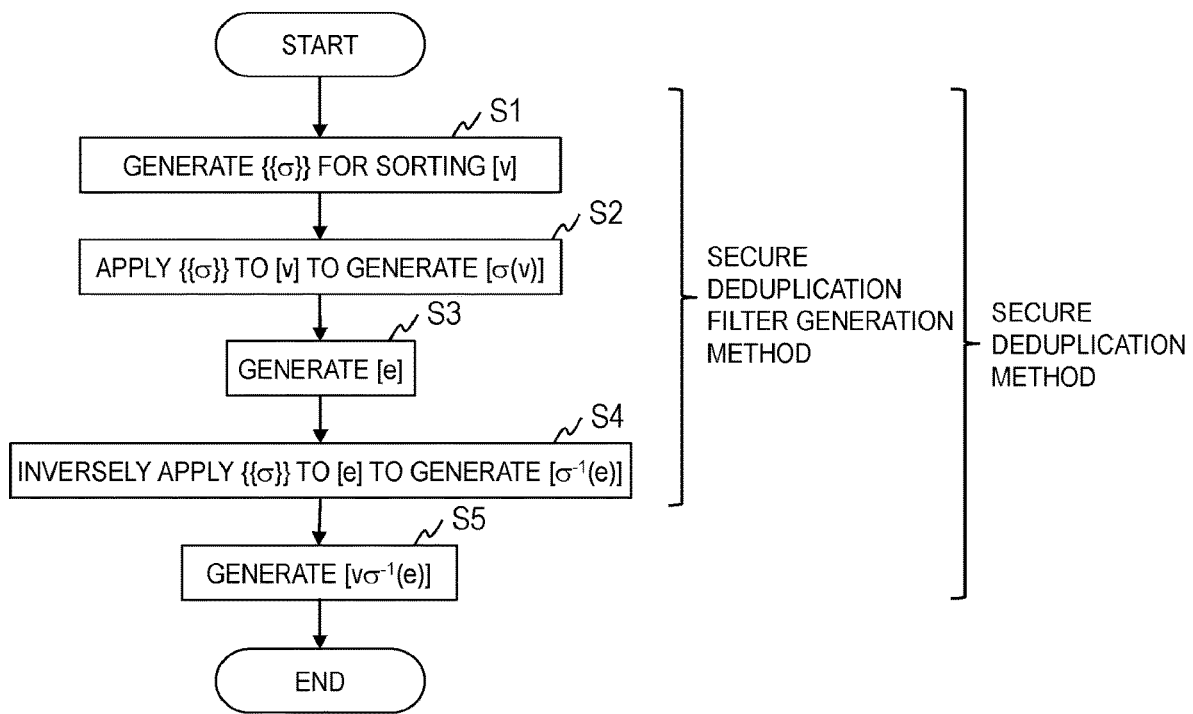
FIG. 3 is a diagram exemplifying a processing procedure of a secure deduplication filter generation method and the secure deduplication system.

A processing procedure of the secure deduplication filter generation method executed by the secure deduplication system of the embodiment will be described with reference to FIG. 3.

Step S1

A share $[v]$ of a vector v is input into the permutation calculation parts $11_1, \ldots, 11_N$.

The permutation calculation parts $11_1, \ldots, 11_N$ generate $\{\{\sigma\}\}$ of the share $[v]$.

In more detail, the permutation calculation parts $11_1, \ldots, 11_N$ use the share $[v]$ of the vector v to generate the share $\{\{\sigma\}\}$ of a permutation $\sigma$ that stably sorts the vector v in ascending order (step S1). The stable sorting means that order of equivalent data before sorting is preserved after sorting as well.

The generated share $\{\{\sigma\}\}$; is output to the permutation application parts $12_1, \ldots, 12_N$.

F denotes an arbitrary field, and m denotes an integer of two or more. Further, v denotes an m-dimensional vector $v \in F^m$. The vector v is, for example, a vector composed of attribute values of a certain attribute in a table.

For example, it is supposed that the vector v is a vector composed of attribute values of an attribute of "height" and v=(160, 150, 160, 170, 160). In this case, the permutation $\sigma$ is as shown in the following Formula (1).

Expression 1

Note that each element of the vector v may be bit-decomposed. That is, each element of the vector v may be represented by bits of 0 and 1. In addition, the vector v may be a vector composed of values obtained by combining attribute values of a plurality of attributes of a table.

Step S2

The share $[v]$ and share $\{\{\sigma\}\}$ are input into the permutation application parts $12_1, \ldots, 12_N$.

The permutation application parts $12_1, \ldots, 12_N$ apply the share $\{\{\sigma\}\}$ to the share $[v]$ to generate a share $[\sigma(v)]$.

In more detail, the permutation application parts $12_1, \ldots, 12_N$ use the share $[v]$ and share $\{\{\sigma\}\}$ to generate the share $[\sigma(v)]$ of a vector $\sigma(v)$ obtained by applying the permutation $\sigma$ to the vector v (step S2).

The generated share $[\sigma(v)]$ is output to the vector generation parts $13_1, \ldots, 13_N$.

For example, the vector v=(160, 150, 160, 170, 160), and when the permutation $\sigma$ is a permutation represented by Formula (1), the vector $\sigma(v)$=(150, 160, 160, 160, 170).

Step S3

The share $[\sigma(v)]$ is input into the vector generation parts $13_1, \ldots, 13_N$.

The vector generation parts $13_1, \ldots, 13_N$ generate [e] in which $[e_i]:=[\sigma(v)_i \neq \sigma(v)_{i-1}]$ where $[e_1]=1$, and where i=1, m. Here, $\sigma(v)_i$ is an i-th element of the vector $\sigma(v)$, and $e_i$ is an i-th element of a vector e.

In more detail, the vector generation parts $13_1, \ldots, 13_N$ use the share $[\sigma(v)]$ to generate the share [e] of the vector e that has 1 as an element corresponding to a certain element when the certain element of the vector $\sigma(v)$ and an element before the certain element are different, and has 0 otherwise (step S3). However, a first element of the vector e is set to 1.

The generated share [e] is output to the inverse permutation application parts $14_1, \ldots, 14_N$.

For example, when the vector $\sigma(v)$=(150, 160, 160, 160, 170), the vector e=(1, 1, 0, 0, 1).

Step S4

The share [e] and share $\{\{\sigma\}\}$ are input into the inverse permutation application parts $14_1, \ldots, 14_N$.

The inverse permutation application parts $14_1, \ldots, 14_N$ inversely apply the share $\{\{\sigma\}\}$ to the share [e] to generate a share $[\sigma^{-1}(e)]$.

In more detail, the inverse permutation application parts $14_1, \ldots, 14_N$ use the share [e] and share $\{\{\sigma\}\}$ to generate the share $[\sigma^{-1}(e)]$ of the vector $\sigma^{-1}(e)$ obtained by applying an inverse permutation $\sigma^{-1}$ of the permutation $\sigma$ to the vector e (step S4). The vector $\sigma^{-1}(e)$ is a vector used for deduplication processing and is also called a filter.

The generated share $[\sigma^{-1}(e)]$ is an output of the secure deduplication filter generation system. When secure deduplication processing is performed subsequent to the secure deduplication filter generation processing, the generated share $[\sigma^{-1}(e)]$ is output to the secure deduplication system.

For example, when the vector e=(1, 1, 0, 0, 1) and the permutation σ is a permutation shown in Formula (1), the vector σ$^{-1}$(e)=(1, 1, 0, 1, 0).

Step S5

The share [v] and share [σ$^{-1}$(e)] are input into the deduplication parts $15_1, \ldots, 15_N$.

The deduplication parts $15_1, \ldots, 15_N$ generate a share [vσ$^{-1}$(e)] of vσ$^{-1}$(e).

In more detail, the deduplication parts $15_1, \ldots, 15_N$ use the share [v] and share [σ$^{-1}$(e)] to generate the share [vσ$^{-1}$(e)] of vσ$^{-1}$(e) (step S5).

For example, when the vector v=(160, 150, 160, 170, 160) and the vector σ$^{-1}$(e)=(1, 1, 0, 1, 0), the vector vσ$^{-1}$(e)=(160, 150, 0, 170, 0). In this way, the vector vσ$^{-1}$(e) is a vector obtained by removing duplicate elements from the vector v.

According to the embodiment, it is possible to generate a filter that eliminates duplication while maintaining secrecy. In addition, according to the embodiment, it is possible to eliminate duplication while maintaining secrecy using the generated filter.

Modification

As described above, the embodiment of the present invention has been described, but specific configurations are not limited to the embodiment, and it goes without saying that even if there is a change or the like in design as appropriate without departing from the scope of the present invention, it is included in the invention.

For example, the deduplication parts $15_1, \ldots, 15_N$ may use a share [w] and the share [σ$^{-1}$(e)] to obtain a share [wσ$^{-1}$(e)] of wσ$^{-1}$(e) obtained by applying the filter σ$^{-1}$(e) to a vector w of attribute values of an attribute other than the attribute based on which the share [σ$^{-1}$(e)] is generated.

For example, when the vector σ$^{-1}$(e) obtained from the attribute of "height" is the vector σ$^{-1}$(e)=(1, 1, 0, 1, 0) and a vector w of attribute values of an attribute of "gender" is the vector w=(man, woman, man, woman, man), the vector wσ$^{-1}$(e)=(man, woman, 0, woman, 0). The deduplication parts $15_1, \ldots, 15_N$ may use the share [w] and share [σ$^{-1}$(e)] to obtain the share [wσ$^{-1}$(e)] of such a vector wσ$^{-1}$(e).

The deduplication parts $15_1, \ldots, 15_N$ may also obtain shares obtained by applying the filter σ$^{-1}$(e) to respective vectors of attribute values of a plurality of attributes.

The various processes described in the embodiment may be performed not only in chronological order according to the described order, but also in parallel or individually according to processing capability of a apparatus that performs the processes or as needed.

Program and Recording Medium

When various processing functions in each apparatus described in the embodiment are implemented by a computer, processing contents of functions which each apparatus should include are described by a program. Then, the computer executes the program, and thereby the various processing functions in each apparatus are implemented on the computer.

The program describing the processing contents can be recorded in a computer-readable recording medium. The computer-readable recording medium may be any recording medium, for example, a magnetic recording apparatus, an optical disk, a magneto-optical recording medium, and a semiconductor memory.

Distribution of this program is carried out, for example, by selling, transferring, or lending a portable recording medium such as a DVD or a CD-ROM on which the program is recorded. Furthermore, the program may be stored in a storage apparatus of a server computer, transferred from the server computer to another computer via a network, and thereby distributed.

A computer that executes such a program, for example, first stores the program recorded on the portable recording medium or the program transferred from the server computer temporarily in its own storage apparatus. Then, when performing processing, the computer reads the program stored in its own storage apparatus and performs the processing according to the read program. As another execution form of the program, the computer may directly read the program from the portable recording medium, and perform the processing according to the program, or further may sequentially execute processing according to a received program every time the program is transferred from the server computer to the computer. In addition, the above-described processing may be performed by a so-called ASP (Application Service Provider) type service that implements a processing function only by execution instructions and result acquisition, without transferring the program from the server computer to the computer. Note that the program in the embodiment includes information which is used for processing by the computer and is similar to the program (data or the like that is not a direct command to the computer but has properties that define processing of the computer).

In the embodiment, the apparatus is configured by executing the predetermined program on the computer, but at least a part of the processing contents may be implemented by hardware.

What is claimed is:

1. A secure deduplication filter generation system comprising a plurality of secure computation apparatuses connected over a network, wherein assuming that F denotes an arbitrary field, m denotes an integer of two or more, [α] denotes a share where α is securely shared supposing α to be an arbitrary vector, {{β}} denotes a share where β is securely shared supposing β to be an arbitrary permutation, and v denotes an m-dimensional vector v∈F$^m$, each of the plurality of secure computation apparatuses comprise:

processing circuitry configured to
receive an input of a share [v] of the vector v, such that the vector v is concealed from each of the plurality of secure computation apparatuses, and generate a share {{σ}} of a permutation σ that stably sorts the vector v in ascending order using a share [v] of the vector v;

generate a share [σ(v)] of a vector σ(v) obtained by applying the permutation σ to the vector v using the share [v] and the share {{σ}};

generate a share [e] of a vector e having 1 as an element corresponding to a certain element when the certain element of the vector σ(v) and an element before the certain element are different, and having 0 otherwise using the share [σ(v)]; and generate a share [σ$^{-1}$(e)] of a vector σ$^{-1}$(e) obtained by applying an inverse permutation σ$^{-1}$ of the permutation σ to the vector e using the share [e] and the share {{σ}}.

2. The secure deduplication filter generation system according to claim 1,
wherein the processing circuitry of the plurality of secure computation apparatuses is further configured to generate a share $[v\sigma^{-1}(e)]$ of $v\sigma^{-1}(e)$ using the share $[v]$ and the share $[\sigma^{-1}(e)]$.

3. A secure deduplication filter generation method implemented by a secure deduplication filter generation system including a plurality of secure computation apparatuses connected over a network, wherein
assuming that F denotes an arbitrary field, m denotes an integer of two or more, $[\alpha]$ denotes a share where $\alpha$ is securely shared supposing $\alpha$ to be an arbitrary vector, $\{\{\beta\}\}$ denotes a share where $\beta$ is securely shared supposing $\beta$ to be an arbitrary permutation, and v denotes an m-dimensional vector $v \in F^m$,
the method comprises performing by processing circuitry of each of the plurality of secure computation apparatuses:
receiving an input of a share $[v]$ of the vector v, such that the vector v is concealed from each of the plurality of secure computation apparatuses, and
generating a share $\{\{\sigma\}\}$ of a permutation $\sigma$ that stably sorts the vector v in ascending order using a share $[v]$ of the vector v;
generating a share $[\sigma(v)]$ of a vector $\sigma(v)$ obtained by applying the permutation 6 to the vector v using the share $[v]$ and the share $\{\{\sigma\}\}$;
generating a share $[e]$ of a vector e having 1 as an element corresponding to a certain element when the certain element of the vector $\sigma(v)$ and an element before the certain element are different, and having 0 otherwise using the share $[\sigma(v)]$; and
generating a share $[\sigma^{-1}(e)]$ of a vector $\sigma^{-1}(e)$ obtained by applying an inverse permutation $\sigma^{-1}$ of the permutation $\sigma$ to the vector e using the share $[e]$ and the share $\{\{\sigma\}\}$.

4. The secure deduplication filter generation method according to claim 3, further comprising:
generating, by the processing circuitry of each of the plurality of secure computation apparatuses, a share $[v\sigma^{-1}(e)]$ of $v\sigma^{-1}(e)$ using the share $[v]$ and the share $[\sigma^{-1}(e)]$.

* * * * *